United States Patent [19]

Degnan et al.

[11] Patent Number: 5,486,284

[45] Date of Patent: Jan. 23, 1996

[54] CATALYTIC CRACKING WITH MCM-49

[75] Inventors: Thomas F. Degnan, Moorestown, N.J.; Terry E. Helton; Daria N. Lissy, both of Glen Mills, Pa.

[73] Assignee: Mobil Oil Corporation, Fairfax, Va.

[21] Appl. No.: 297,468

[22] Filed: Aug. 15, 1994

[51] Int. Cl.⁶ ................................. C10G 11/05
[52] U.S. Cl. .................. 208/120; 208/113; 208/114; 208/118
[58] Field of Search .................. 208/113, 114, 208/118, 120, 129 MC

[56] References Cited

U.S. PATENT DOCUMENTS

| | | | |
|---|---|---|---|
| 4,309,279 | 1/1992 | Chester et al. | 208/120 |
| 4,740,292 | 4/1988 | Chen et al. | 208/120 |
| 5,236,575 | 8/1993 | Bennett et al. | 208/46 |
| 5,264,643 | 11/1993 | DiGuiseppi et al. | 585/533 |
| 5,371,310 | 12/1994 | Bennett et al. | 585/467 |
| 5,401,391 | 3/1995 | Collins et al. | 208/208 R |
| 5,401,896 | 3/1995 | Kuehl et al. | 585/455 |
| 5,430,000 | 7/1995 | Timken | 502/60 |

Primary Examiner—E. Rollins Cross
Assistant Examiner—Walter D. Griffin
Attorney, Agent, or Firm—Alexander J. McKillop; Malcolm D. Keen; Richard D. Stone

[57] ABSTRACT

This invention relates to use of MCM-49 in catalytic cracking. Large amounts of light olefins are produced.

17 Claims, 1 Drawing Sheet u.s. Patent    Jan. 23, 1996    5,486,284

CATALYTIC CRACKING WITH MCM-49

CROSS-REFERENCE TO RELATED APPLICATION

This is related to U.S. Pat. No. 5,236,575, Dated Aug. 17, 1993, which discloses and claims MCM-49, its synthesis and use.

BACKGROUND OF THE INVENTION

1. Field of the Invention

This invention relates to use of MCM-49 in catalytic cracking.

2. Description of the Related Art

Many refineries devote extraordinary amounts of energy and operating expense to convert most of a whole crude oil feed into high octane gasoline. The crude is fractionated to produce a virgin naphtha fraction which is usually reformed, and gas oil and/or vacuum gas oil fractions which are catalytically cracked to produce cracked naphtha, and light olefins. The cracked naphtha is added to the refiners gasoline blending pool, while the light olefins are converted, usually by HF or sulfuric acid alkylation, into gasoline boiling range material which is then added to the gasoline blending pool.

Fluid catalytic cracking (FCC) is the preferred refining process for converting higher boiling petroleum fractions into lower boiling products, especially gasoline. In FCC, a solid cracking catalyst promotes hydrocarbon cracking reactions. The catalyst is in a finely divided form, typically with particles of 20–100 microns, with an average of about 60–75 microns. The catalyst acts like a fluid (hence the designation FCC), and circulates in a closed cycle between a cracking zone and a separate regeneration zone. Fresh feed contacts hot catalyst from the regenerator at the base of a riser reactor. The cracked products are discharged from the riser cracking reactor to pass through a main column which produces several liquid streams and a vapor stream containing large amounts of light olefins. The vapor stream is compressed in a wet gas compressor and charged to the unsaturated gas plant for product purification.

A further description of the catalytic cracking process may be found in the monograph, "Fluid Catalytic Cracking With Zeolite Catalysts," P. B. Venuto and E. T. Habib, Marcel Dekker, New York, 1978, incorporated by reference.

An earlier process, moving bed cracking or Thermofor Catalytic Cracking (TCC), is still used in some refineries. The catalyst is in the form of small beads, which pass as a moving bed through a reactor and regenerator. The feed and product properties can be the same, but TCC units usually can crack only distilled feeds, whereas FCC can process feeds containing some residual materials.

While FCC is already an efficient process for converting heavy feed to lighter products, substantial modifications to FCC catalysts and hardware are likely to be required as a result of the 1990 Clean Air Act Amendments (CAAA). In particular, it is expected that there will be an increased demand for C3 and C4 olefins for alkylation and C4 and C5 olefins for methyltertbutyl and ethyltertbutyl ethers (MTBE and ETBE) to reduce gasoline aromatic content and increase gasoline oxygenate content. Anticipated difficulties include maintaining gasoline octane and generating enough light olefins to make oxygenates.

There are a number of widely recognized methods to increase light olefin make. For example, one widely accepted method is to substitute an ultrastable Y zeolite for a rare earth exchanged Y zeolite in the base cracking catalyst. Another is to increase the riser top temperature. A third method is to use a secondary or "quench" stream at some point along the length of the riser. Yet another method is to add ZSM-5 to the zeolite Y based cracking catalyst.

There are problems associated with each method of increasing yield of light olefins. Substituting a rare earth-free ultrastable Y zeolite for a rare earth exchanged Y produces a less stable and less active cracking catalyst. Higher riser top temperatures produce more undesirable light products such as methane and ethane and also produce more dienes in the gasoline which lead to gum formation and fouling. Introduction of a quench stream can limit the fresh feed rate on a unit close to its hydraulic limit. Addition of ZSM-5 can greatly increase light olefin yields, but adds to the cost and, if used at high concentrations, may dilute the "base" Y cracking catalyst.

Some catalytic approaches to increasing light olefin yields will now be reviewed.

Zeolite Y+ZSM-5

Use of ZSM-5 in combination with a zeolite Y based catalyst is described in U.S. Pat. Nos. 3,758,403; 3,769,202; 3,781,226; 3,894,931; 3,894,933; 3,894,934; 3,926,782; 4,100,262; 4,309,280; 4,309,279; 4,375,458 which are incorporated by reference.

Zeolite Y+Other Zeolites

Combinations of zeolite Y and other zeolites and molecular sieves including crystalline silicoaluminophosphates (SAPOs) have shown potential for increasing light olefins and octane at the expense of gasoline yield. To date, the commercial application of crystalline materials other than ZSM-5 as octane cracking catalysts appears to be limited. The scientific and patent literature includes references to the evaluation of at least four other shape selective aluminosilicate zeolites as FCC additives. These are: offretite (U.S. Pat. No. 4,992,400), ZSM-23, ZSM-35 (U.S. Pat. No. 4,016, 245) and ZSM-57 (U.S. Pat. No. 5,098,555) Non-zeolitic molecular sieve patents teach the use of SAPO-5 (U.S. Pat. No. 4,791,083; EP 0 202 304 B1), SAPO-11 (U.S. Pat. No. 4,791,083) and SAPO-37 (U.S. Pat. Nos. 4,842,714; 4,681, 864) in FCC.

There are references to the use of zeolite beta with zeolite Y catalysts as a means for improving gasoline octane and producing light olefins. Chen et al., in U.S. Pat. No. 4,740, 292 and in U.S. Pat. No. 4,911,823, incorporated by reference, describe the use of REY+zeolite beta to improve the octane of gasoline while increasing the yield of C3/C4 olefins.

While all of the above approaches helped increase olefin yields in FCC, none provided a complete solution to the problem of making more light olefins, while maintaining gasoline yields and gasoline octane. Some required use of zeolite additives made from exotic organic templates and/or relied on use of zeolite additives which might not have the stability to survive the harsh conditions in modern FCC regenerators, which could also be correctly called hydrothermal deactivators.

We knew that cracking refineries of the future would need more olefins, and more octane. Refineries would also need to produce these fuels of the future without scrapping their existing processing units, and without major capital expense.

We discovered a new cracking catalyst, which could be used alone or in combination with conventional zeolite Y based cracking catalyst to produce extraordinary amounts of light olefins. Our new cracking catalyst, or cracking catalyst additive, dramatically increased yields of light olefins, such as propylene and butylene, and significantly increased yields of isobutane. Although there was some loss of FCC gasoline yield, this was more than offset by potential yield of liquid fuels from incremental light olefin and isobutane yields.

We achieved these benefits by using MCM-49 as a cracking catalyst additive, or as a replacement for the conventional zeolites used in the cracking catalyst.

SUMMARY OF THE INVENTION

Accordingly, the present invention provides a process for catalytic cracking, in the absence of added hydrogen, of a normally liquid hydrocarbon feed containing hydrocarbons boiling above 650° F. comprising cracking said liquid feed in a cracking reactor at cracking conditions by contact with a source of regenerated equilibrium catalyst comprising catalytically effective amounts of MCM-49.

In another embodiment, the present invention provides a process for catalytically cracking a hydrocarbon feed boiling above 650° F. comprising charging said hydrocarbon feed to a riser catalytic cracking reactor; charging a hot fluidized solids mixture from a catalyst regenerator to the base of said riser reactor, said mixture comprising a physical mixture of 95 to 50 wt % base FCC catalyst containing zeolite Y, zeolite beta or both in a matrix, and 5 to 50 wt % MCM-49 catalyst additive containing a catalytically effective amount of MCM-49 in an amorphous support; catalytically cracking said feed at catalytic cracking conditions including a riser outlet temperature of about 925° to 1100° F. to produce catalytically cracked products including C3 and C4 olefins and a catalytically cracked naphtha fraction having an octane number and a spent solids mixture comprising spent cracking catalyst and MCM-49 additive catalyst which are discharged from said outlet of said riser reactor; separating in a vessel containing said riser outlet a cracked product rich vapor phase, which is withdrawn from said vessel, from a spent solids mixture rich phase containing spent cracking catalyst and shape selective additive catalyst; stripping said spent solids mixture in a stripping means at stripping conditions to produce a stripped solids phase; decoking said stripped solids mixture in a catalyst regeneration means operating at catalyst regeneration conditions to produce said hot fluidized solids mixture, which is recycled to the base of said riser reactor, and fractionating said cracked product rich vapor phase in a product fractionation means to produce an overhead vapor fraction, a liquid fraction containing at least one of C3 and C4 olefins and a catalytically cracked naphtha fraction.

DETAILED DESCRIPTION OF PREFERRED EMBODIMENTS

Figure 1:
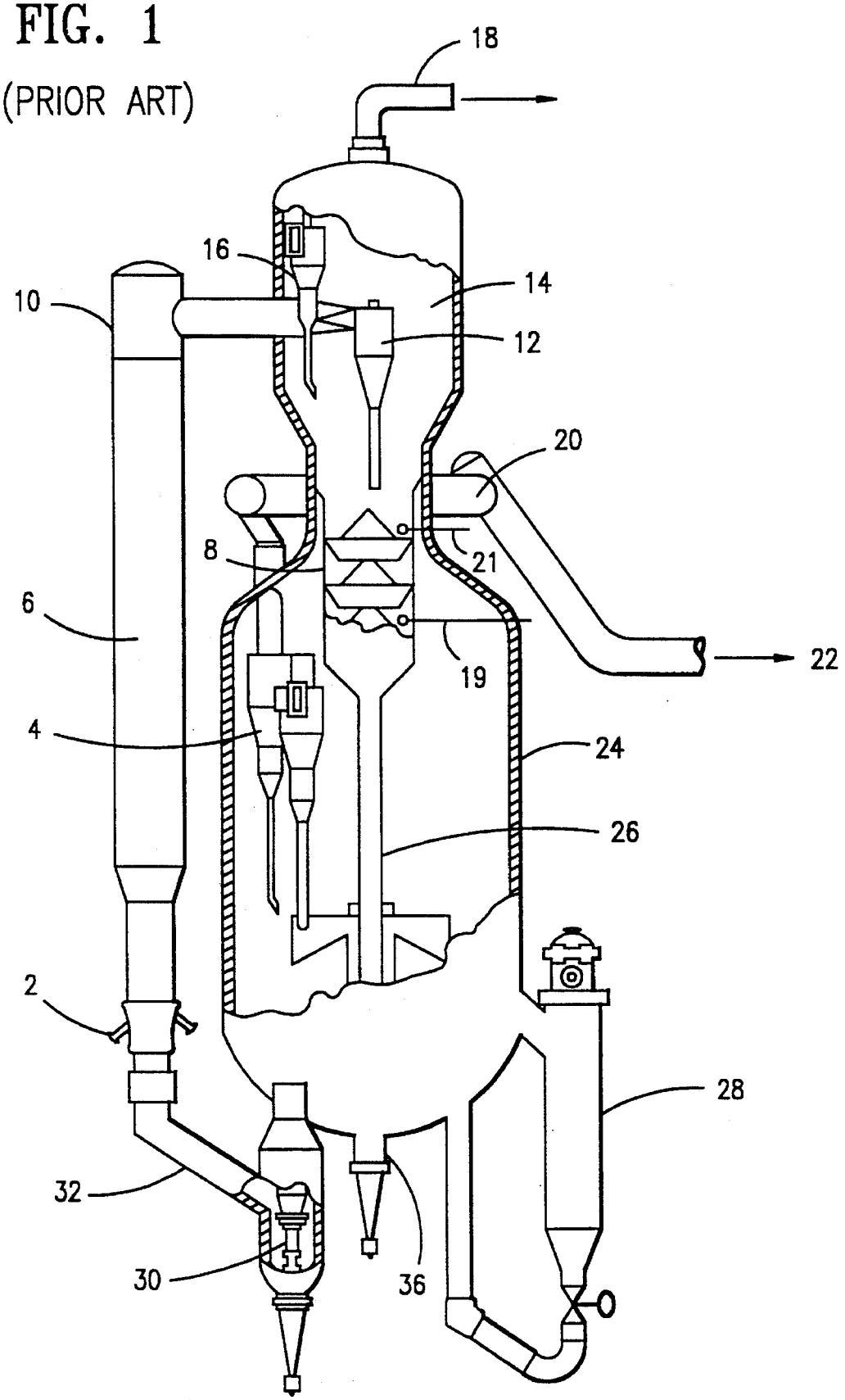
FIG. 1 shows a conventional FCC unit with a riser reactor.

FIG. 1 (Prior Art) is a simplified schematic view of an FCC unit of the prior art, similar to the Kellogg Ultra Orthoflow converter Model F shown as FIG. 17 of Fluid Catalytic Cracking Report, in the Jan. 8, 1990 edition of Oil & Gas Journal.

A heavy feed such as a gas oil, vacuum gas oil is added to riser reactor 6 via feed injection nozzles 2. The cracking reaction is completed in the riser reactor, which takes a 90° turn at the top of the reactor at elbow 10. Spent catalyst and cracked products discharged from the riser reactor pass through riser cyclones 12 which efficiently separate most of the spent catalyst from cracked product. Cracked product is discharged into disengager 14, and eventually is removed via upper cyclones 16 and conduit 18 to the fractionator.

Spent catalyst is discharged down from a dipleg of riser cyclones 12 into catalyst stripper 8, where one, or preferably 2 or more, stages of steam stripping occur, with stripping steam admitted via lines 19 and 21. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

This stripper design is efficient due to its generous size. Most riser reactor FCC's have strippers disposed as annular beds about the riser reactor, and do not provide this much cross sectional area for catalyst flow.

Catalyst is regenerated in regenerator 24 with air, added via air lines and air grid distributor not shown. Cat cooler 28 permits heat removal from the regenerator. Regenerated catalyst is withdrawn via regenerated catalyst plug valve assembly 30 and discharged via lateral 32 into the base of the riser reactor 6 to contact and crack fresh feed injected via injectors 2, as previously discussed. Flue gas, and some entrained catalyst, are discharged into a dilute phase region in the upper portion of regenerator 24. Entrained catalyst is separated from flue gas in multiple stages of cyclones 4, and discharged into plenum 20 for discharge to the flare via line 22.

Having provided an overview of the process and apparatus of the invention, more details will now be provided about the FCC process and the reactor design (both of which can be conventional) and the catalyst system of the present invention.

FEED

Any conventional FCC or moving bed cracking unit feed can be used. The feeds for FCC may range from the typical, such as petroleum distillates or residual stocks, either virgin or partially refined, to the atypical, such as coal oils and shale oils. Moving bed cracking units usually can not handle feeds containing much resid. The feed frequently will contain recycled hydrocarbons, such as light and heavy cycle oils which have already been cracked. Most, and usually more than 90 wt %, of the feed will have a boiling point above 650° F.

REACTOR CONDITIONS

Conventional cracking conditions may be used. In FCC processing, riser cracking is preferred. Most riser FCC units operate with catalyst/oil weight ratios of 1:1 to 10:1, and a hydrocarbon residence time of 1–10 seconds. Most operate with reactor outlet temperatures of 950°–1050° F. The reactor outlet temperature is preferably above 1000° F., most preferably from 1025° to 1100° F., and most preferably about 1075° F. Short contact times, 0.1–1 seconds, and temperatures of 1000°–1200° F., may also be used. Quench is beneficial but not essential.

Conventional all riser cracking FCC's, such as disclosed in U.S. Pat. No. 4,421,636, incorporated by reference, may be used.

In moving bed cracking units, such as the one shown in U.S. Pat. No. 4,980,051, incorporated by reference, conventional conditions may also be used. More details about the TCC design and operating conditions are also reported by Avidan and Shinnar in Development of Catalytic Cracking Technology. A Lesson in Chemical Reactor Design, I & EC RESEARCH, 1990, 29, which is incorporated by reference. Typical TCC cracking conditions include a cat:oil weight ratio of 1.5 to 15, and preferably 4 to 10, and a reactor temperature of 450° to 550° C., preferably about 500° to 530° C. The catalyst formulation for TCC can be identical to that used in FCC units, but the catalyst will be in the form of 3–5 mm spheres.

FCC RISER REACTOR OUTLET/CATALYST SEPARATION

It is preferred, but not essential, to separate rapidly spent catalyst from cracked products discharged from the reactor. Use of a cyclone separator, or other inertial separator, will help separate coked catalyst from cracked products.

It is preferred, but not essential, to use efficient atomizing feed nozzles. Good nozzles are disclosed in U.S. Pat. No. 5,306,418 which is incorporated by reference.

Closed cyclones, such as those available from the M. W. Kellogg Company, which rapidly remove cracked products from the reactor vessel, are preferred.

CATALYST STRIPPING

Conventional stripping techniques can be used to remove strippable hydrocarbons from spent catalyst, usually contact with 1 to 5 wt % steam.

CATALYST REGENERATION

The process and apparatus of the present invention can use conventional FCC regenerators. Most use a single large vessel, with a dense phase, bubbling fluidized bed of catalyst. High efficiency regenerators, with a fast fluid bed coke combustor, a dilute phase transport riser above it, and a second fluidized bed to collect regenerated catalyst, may be used. More details about several representative bubbling dense bed regenerators are presented below.

Swirl regenerators are disclosed in U.S. Pat. No. 4,490,241, Chou, and U.S. Pat. No. 4,994,424 Leib and Sapre, incorporated by reference.

A cross-flow regenerator is disclosed in U.S. Pat. No. 4,980,048 Leib and Sapre, incorporated by reference.

A regenerator associated with a stacked or Orthoflow type FCC unit is disclosed in U.S. Pat. No. 5,032,252 and U.S. Pat. No. 5,043,055 Owen and Schipper, incorporated by reference.

TCC regeneration conditions include catalyst air contact at temperature from 600° to 700° C., with the catalyst passing as a moving bed through the regenerators, sometimes called kilns.

CATALYST SYSTEM OF THE INVENTION

The catalyst system of the invention must contain catalytically effective amounts of MCM-49. Its synthesis is disclosed in U.S. Pat. No. 5,236,575, which is incorporated by reference.

The as synthesized material is usually in the sodium form, and is preferably placed in the hydrogen form for use in catalytic cracking. This can be done using techniques well known in the art, such as ion exchange with other cations. Preferred replacing cations include metal ions, hydrogen ions, hydrogen precursor, e.g., ammonium, ions and mixtures thereof. Particularly preferred cations are hydrogen and rare earth metals and metals of Groups IIA, IIIA, IVA, IB, IIB, IIIB, IVB and VIII of the Periodic Table of the Elements.

The MCM-49 appears to be essentially pure. It is related to, but distinguished from, MCM-56. The X-ray diffraction pattern of several related materials is shown in Table I (as synthesized) and Table II (calcined). In these tables, intensities are defined relative to the d-spacing line at 12.4 Angstroms.

TABLE I

| MCM-56 | | Layered Material Interplanar d-Spacing | | Material MCM-49 | |
|---|---|---|---|---|---|
| Interplanar | | | | Interplanar | |
| d-Spacing (A) | Relative Intensity | Spacing (A) | Relative Intensity | d-spacing (A) | Relative Intensity |
| — | — | 13.5 | m | — | — |
| 12.4 ± 0.2 | vs | 12.4 | m–vs | 12.5 | vs |
| — | — | 11.1 | m | 11.2 | m–s |
| 9.9 ± 0.3 | m | — | — | — | — |
| — | — | 9.2 | m | 9.0 | m |
| 6.9 ± 0.1 | w | 6.9 | w | 6.9 | w |
| 6.4 ± 0.3 | w | 6.7 | w | 6.4 | w |

TABLE I-continued

| MCM-56 | | Layered Material Interplanar d-Spacing | | Material MCM-49 | |
|---|---|---|---|---|---|
| Interplanar | | | | Interplanar | |
| d-Spacing (A) | Relative Intensity | Spacing (A) | Relative Intensity | d-spacing (A) | Relative Intensity |
| 6.2 ± 0.1 | w | 6.2 | w | 6.2 | m |
| 3.57 ± 0.07 | m–s | 3.56 | w–m | 3.55 | w–m |
| 3.44 ± 0.07 | vs | 3.43 | s–vs | 3.44 | vs |

TABLE II

| MCM-56 | | MCM-22 Interplanar d-Spacing | | MCM-49 | |
|---|---|---|---|---|---|
| Interplanar | | | | Interplanar | |
| d-Spacing (A) | Relative Intensity | Spacing (A) | Relative Intensity | d-spacing (A) | Relative Intensity |
| 12.4 ± 0.2 | vs | 12.4 | m–vs | 12.4 | vs |
| — | — | 11.0 | m–s | 11.1 | s |
| 9.9 ± 0.3 | m–s | — | — | — | — |
| — | — | 8.8 | m–vs | 8.9 | m–s |
| 6.9 ± 0.1 | w | 6.9 | w–m | 6.9 | w |
| 6.2 ± 0.1 | s | 6.2 | m–vs | 6.2 | m |
| 3.55 ± 0.07 | m–s | 3.56 | w–m | 3.57 | w |
| 3.42 ± 0.07 | vs | 3.42 | vs | 3.43 | s–vs |

The materials used for generation of the data in Table I were wet cake layered MCM-56, wet cake layered material synthesized with the same organic directing agent which, when calcined, transforms into MCM-22, and wet cake crystalline MCM-49. The materials used for the data in Table II were the calcined materials used for Table I. Calcination of each material was in air at 540° C. for 2–20 hours. The most effective diagnostic feature allowing the initial differentiation between MCM-56 and MCM-49 is observed in the region of 8.8–11.2 Angstroms d-spacing.

Other features which distinguish these similar materials are summarized in Table III below.

TABLE III

| Feature | MCM-22 | MCM-49 | MCM-56 |
|---|---|---|---|
| As-synthesized: | | | |
| Structure | layered | 3-dimensional | layered |
| Swellable | yes | no | yes |
| Condenses upon Calcination | yes | yes | no |
| Calcined: | | | |
| Sorption capacity for 1,3,5-trimethyl benzene[1] | low | low | high |
| Initial uptake of 2,2-dimethylbutane[2] | slow | slow | fast |

[1]Low sorption capacity is defined as less than about 8 to 10 μl/g. High capacity is at least about 4 times the low capacity. Calcined MCM-56 sorbs at least about 35 μl/g.
[2]Initial uptake is defined as time to adsorb the first 15 mg of 2,2-dimethylbutane/gram of sorbent. Fast uptake is less than 20 seconds; slow uptake is at least 5 times the fast value.
One gram of calcined MCM-56 sorbs 15 mg of 2,2-dimethylbutane in less than about 20 seconds, e.g., less than about 15 seconds.

The MCM-49 may be made into a catalyst for use in FCC or TCC using conventional techniques. Preferably the catalyst includes phosphorus or a phosphorus compound to increase stability. More details will now be provided about some suitable methods of making the catalyst.

The MCM-49 catalyst may comprise from 0.5 to 90 wt %, or more of the catalyst composition. We prefer to operate with 10 to 50 wt % MCM-49 in the catalyst.

The lower limit is set more by economics than anything else, we like the benefits of this new catalyst and usually would not want to have less than 10 wt % present. We may use blends of conventional E-Cat and MCM-49 additive, and in such a blend the concentration of MCM-49 may be much lower, ranging from 0.5 to 5.0 wt % of the catalyst inventory, on a pure MCM-49 basis.

The upper limit is set more by strength and manufacturing considerations than anything else. It is easy to make a catalyst with 25 to 50 Wt % MCM-49, but becomes more difficult as concentrations go above 70 wt %. There is some loss in crush strength as the percentage of conventional matrix materials such as clay, silica:alumina etc., decreases.

Although neither the cracking catalyst nor the additive catalyst need be steamed prior to use, they may be steamed at about 300° C. to 800° C. for 0.1 to 200 hours in about 5 to about 100% steam. We usually steam before testing the materials, to simulate normal aging in an FCC unit.

The catalyst may include metals useful in promoting the oxidation of CO to $CO_2$ as described in U.S. Pat. Nos. 4,072,600 and 4,350,614, which are incorporated by reference. The catalyst may comprise, for example, from about 0.01 ppm to about 100 wt ppm promoter, usually about 0.1 to 5 ppm by weight of platinum.

EXAMPLE 1

MCM-49 Prep

A 2.24 part quantity of 45% sodium aluminate was added to a solution containing 1.0 part of 50% NaOH solution and 43.0 parts $H_2O$ in an autoclave. An 8.57 part quantity of Ultrasil precipitated silica was added with agitation, hexamethyleneimine (HMI).

The reaction mixture had the following composition, in mole ratios:

| | |
|---|---|
| $SiO_2/Al_2O_3$ = | 23 |
| $OH^-/SiO_2$ = | 0.21 |
| $Na/SiO_2$ = | 0.21 |
| $HMI/SiO_2$ = | 0.35 |
| $H_2O/SiO_2$ = | 9.3 |

The mixture was crystallized at 150° C. for 84 hours with stirring. The product was identified as MCM-49 and had the X-ray pattern which appears in Table IV.

The chemical composition of the product was, in wt. %

| | |
|---|---|
| Na | 0.70 |
| $Al_2O_3$ | 7.3 |
| $SiO_2$ | 74.5 |
| Ash | 84.2 |

The silica/alumina mole ratio of the product was 17.3.

The sorption capacities, after calcining at 538° C. for 9 hours were, in wt. %,

| | |
|---|---|
| Cyclohexane, 40 Torr | 10.0 |
| n-Hexane, 40 Torr | 13.1 |
| $H_2O$, 12 Torr | 15.4 |

A portion of the sample was calcined in air for 3 hours at 538° C. This material exhibited the X-ray diffraction pattern shown in Table V.

TABLE IV

| 2 theta | d (A) | I/I$_o$ |
|---|---|---|
| 3.1 | 28.5 | 18 |
| 3.9 | 22.8 | 7+ |
| 6.81 | 12.99 | 61 sh |
| 7.04 | 12.55 | 97 |
| 7.89 | 11.21 | 41 |
| 9.80 | 9.03 | 40 |
| 12.76 | 6.94 | 17 |
| 13.42 | 6.60 | 4* |
| 13.92 | 6.36 | 17 |
| 14.22 | 6.23 | 11 |
| 14.63 | 6.05 | 2 |
| 15.81 | 5.61 | 15 |
| 17.71 | 5.01 | 4 |
| 18.86 | 4.71 | 4 |
| 19.23 | 4.62 | 6 |
| 20.09 | 4.42 | 27 |
| 20.93 | 4.24 | 8 |
| 21.44 | 4.14 | 17 |
| 21.74 | 4.09 | 37 |
| 22.16 | 4.01 | 17 |
| 22.56 | 3.94 | 58 |
| 23.53 | 3.78 | 26 |
| 24.83 | 3.59 | 22 |
| 25.08 | 3.55 | 10 |
| 25.86 | 3.45 | 100 |
| 26.80 | 3.33 | 28 |
| 27.53 | 3.24 | 21 |
| 28.33 | 3.15 | 15 |
| 28.98 | 3.08 | 4 |
| 29.47 | 3.03 | 2 |
| 31.46 | 2.843 | 4 |
| 32.08 | 2.790 | 6 |
| 33.19 | 2.699 | 9 |
| 34.05 | 2.633 | 5 |
| 34.77 | 2.580 | 4 |
| 36.21 | 2.481 | 2 |
| 36.90 | 2.436 | 3 |
| 37.68 | 2.387 | 8 | sh = Shoulder
+ = Non-crystallographic MCM-49 peak
* = Impurity peak

TABLE V

| 2-Theta | d (A) | I/I$_o$ |
|---|---|---|
| 3.2 | 28.0 | 9+ |
| 3.9 | 22.8 | 7+ |
| 6.90 | 12.81 | 48 sh |
| 7.13 | 12.39 | 100 |
| 7.98 | 11.08 | 46 |
| 9.95 | 8.89 | 53 |
| 12.87 | 6.88 | 10 |
| 14.32 | 6.18 | 36 |
| 14.74 | 6.01 | 11 |
| 15.94 | 5.56 | 17 |
| 17.87 | 4.96 | 2 |
| 19.00 | 4.67 | 5 |
| 19.35 | 4.59 | 3 |
| 20.24 | 4.39 | 14 |
| 21.06 | 4.22 | 5 |
| 21.56 | 4.12 | 15 |
| 21.87 | 4.06 | 25 |
| 22.32 | 3.98 | 12 |
| 22.69 | 3.92 | 41 |
| 23.69 | 3.76 | 23 |
| 24.95 | 3.57 | 19 |
| 25.22 | 3.53 | 4 |
| 25.99 | 3.43 | 90 |
| 26.94 | 3.31 | 20 |
| 27.73 | 3.22 | 17 |
| 28.55 | 3.13 | 11 |
| 29.11 | 3.07 | 3 |
| 29.63 | 3.01 | 2 |
| 31.59 | 2.833 | 6 |

TABLE V-continued

| 2-Theta | d (A) | I/I₀ |
|---|---|---|
| 32.23 | 2.777 | 4 |
| 33.34 | 2.687 | 9 |
| 34.35 | 2.611 | 4 |
| 34.92 | 2.570 | 3 |
| 36.35 | 2.471 | 2 |
| 37.07 | 2.425 | 2 |
| 37.82 | 2.379 | 6 | sh = Shoulder
+ = Non-crystallographic MCM-49 peak

EXAMPLE 2

MCM-49 Fluid Catalyst

An MCM-49 fluid catalyst was prepared by spray drying an aqueous slurry containing 40 wt. % MCM-49 product from Example 1 in a silica-alumina gel/clay matrix and calcining the spray dried catalyst. The calcination was carried out at 1000° F. for 3 hours in air. The calcined catalyst was then steamed for 10 hours at 1450° F. in 45% steam/55% air at 0 psig. The Alpha Value of the steamed catalyst was measured to be 6.

The MCM-49 fluid catalyst after calcination was 40 wt. % MCM-49, 27.3 wt. % silica, 2.7 wt. % alumina, and 30.0 wt. % kaolin clay.

EXAMPLE 3

MCM-49 Fluid Catalyst+Phosphorus

Example 2 was repeated, but phosphoric acid was added to the slurry. The MCM-49 fluid catalyst after calcination was 40 wt. % MCM-49, 27.3 wt. % silica, 2.7 wt. % alumina, and 30.0 wt. % kaolin clay. The catalyst contained 2.45 wt. % phosphorus.

EXAMPLE 4

Commercial E-Cat

The base case catalyst to be employed in the present study was an REUSY catalyst removed from a commercial FCC unit following oxidative regeneration. Catalyst properties are summarized in Table VI.

TABLE VI

| REUSY, % | 11 |
|---|---|
| Unit cell size, Angstroms | 24.32 |
| Rare earth, wt. % | 3.0 |
| Silica, wt. % | 54.2 |
| Alumina, wt. % | 34.4 |
| Vanadium, ppm | 1050 |
| Nickel, ppm | 460 |
| Sodium, ppm | 3300 |
| Iron, ppm | 4500 |
| Copper, ppm | 37 |
| Platinum, wt. % | 0.98 |
| Surface area, m²/g | 124 |
| Ash, wt. % | 99.58 |
| Packed density, g/cc | 0.96 |
| Pore volume, cc/g | 0.34 |

EXAMPLE 5

MCM-49+E-Cat 25 weights of the catalyst of Example 2 was blended with 75 weights of the E-Cat of Example 4 to provide a catalyst blend.

EXAMPLE 6

P-MCM-49+E-Cat 25 weights of the catalyst of Example 3 was blended with 75 weights of the E-Cat of Example 4 to provide a catalyst blend.

EXAMPLE 7

The catalysts of Examples 4, 5 and 6 were evaluated in a fixed-fluidized bed (FFB) unit at 960° F. and 1.0 minute catalyst contact time using a Sour Heavy Gas Oil (SHGO) with the properties shown in Table VII.

TABLE VII

| Pour point, °F. | 95 |
|---|---|
| CCR, wt. % | 0.56 |
| K.V. @ 40° C. | 104.8 |
| K.V. @ 100° C. | 7.95 |
| Aniline point, °F. | 168.5 |
| Bromine number | 6.9 |
| Gravity, API | 20.1 |
| Carbon, wt. % | 85.1 |
| Hydrogen, wt. % | 12.1 |
| Sulfur, wt. % | 2.6 |
| Nitrogen, wt. % | 0.2 |
| Total, wt. % | 100.0 |
| Nickel, ppm | 0.5 |
| Vanadium, ppm | 0.3 |
| Iron, ppm | 1.2 |
| Copper, ppm | <0.1 |
| Sodium, ppm | 0.8 |

A range of conversions was scanned by varying catalyst/oil ratios. The fixed-fluidized bed (FFB) results (after interpolation at 70 vol. % conversion) are summarized in Table VIII.

TABLE VIII

MCM-49 FCC Activity - 25 wt. % Additive
25% MCM-49 Additive and 75% RE-USY ECAT,
Conversion = 70 vol. %

| | Base Case | 25% Additive/ 75% ECAT | |
|---|---|---|---|
| Description | RE-USY ECAT Example #4 | MCM-49 Example #2 | MCM-49 Example #3 |
| Phosphorus, wt. % | — | 0 | 2.45 |
| C5+ Gasoline, vol % | 55.5 | 50.9 | 44.9 |
| C5+ Gasoline RON | 90.3 | 92.0 | 93.0 |
| G + D, wt. % | 71.1 | 67.0 | 63.0 |
| G + PA, vol % | 76.8 | 80.4 | 79.0 |
| Alkylate Feed | | | |
| C3= + C4= + i-C4, vol % | 19.3 | 25.3 | 29.9 |
| Coke, wt. % | 4.9 | 4.8 | 5.4 |
| LFO, wt. % | 25.6 | 25.4 | 25.7 |
| HFO, wt. % | 7.2 | 7.6 | 7.3 |
| Total C3, vol % | 10.3 | 13.3 | 19.4 |
| Total C4, vol % | 13.0 | 16.8 | 16.7 |
| Total C5=, vol % | 3.7 | 4.9 | 3.7 |
| isobutane, vol % | 6.5 | 7.5 | 9.2 |
| isobutylene, vol % | 1.5 | 2.7 | 2.5 |
| Total C4=, vol % | 5.3 | 7.5 | 6.2 |
| C3, vol % | 2.8 | 3.0 | 4.9 |
| C3=, vol % | 7.5 | 10.3 | 14.5 |
| Light Gases | | | |
| C2, wt. % | 0.7 | 0.6 | 0.7 |
| C2=, wt. % | 0.6 | 0.7 | 0.9 |

TABLE VIII-continued

MCM-49 FCC Activity - 25 wt. % Additive
25% MCM-49 Additive and 75% RE-USY ECAT,
Conversion = 70 vol. %

| Description | Base Case | 25% Additive/ 75% ECAT | |
|---|---|---|---|
| | RE-USY ECAT Example #4 | MCM-49 Example #2 | MCM-49 Example #3 |
| C1, wt. % | 0.7 | 0.5 | 0.6 |
| H$_2$, wt. % | 0.11 | 0.13 | 0.13 |
| H$_2$S, wt. % | 0.84 | 0.83 | 0.78 |
| Total, wt. % | 3.0 | 2.8 | 3.1 |

The results from Table VIII show extraordinary yields of light olefins and of isobutane. Considering only the alkylate feed, there is a roughly 25 to 50% increase in the amount of propylene, C4= and isobutane produced. There is some loss in FCC gasoline, but the yield of gasoline and potential alkylate increases due to use of MCM-49 catalyst. The data show that there is a significant increase in octane # (RONCL, or Research Octane Number, Clear, or with 0.0 g lead added.).

Using our new catalyst as a replacement for, or as an additive with, conventional E-Cat gives refiners a way to make large amounts of oxygenates and/or alklyate from their catalytic cracking units. Expressed in terms of clean fuel precursors, defined as C3=, C4= and iC4, we can generate substantial amounts of clean fuel precursors while continuing to make large volumes of catalytically cracked gasoline.

The prior art FCC process generated large volumes of gasoline, but the amount of clean fuel precursors was less than ½ as large as the gasoline stream. We have provided an efficient method for refiners to produce clean fuel precursors, in an amount ranging from 50 liquid volume (LV %) of the FCC naphtha fraction to 65 to 70 LV % of the naphtha fraction. The FCC unit can now be considered a significant generator of clean fuels.

In terms of clean fuel production, our process allows a refiner to increase by roughly 50% the amount of alkylate and oxygenates made and decrease slightly the amount of FCC gasoline, while increasing its octane. Extrapolating from Table VIII, a conventional 100,000 BPD FCC unit previously made 55,500 BPD of 90.3 RONCl gasoline, and 19,300 BPD of clean fuel precursors (or alkylate feed). Using our process, the same FCC unit can now produce 29,900 BPD of clean fuel precursors. The volume of gasoline is down to 44,900 BPD, but the octane number is significantly higher, 93.0. This higher octane number would allow the refiner to hydrotreat all or a portion of the FCC gasoline to remove sulfur while maintaining an octane number similar to that of FCC gasoline from a conventional FCC process. This is because hydrotreating removes sulfur, but decreases octane. Our process provides enough of an octane "cushion" or reserve, to permit hydrotreating.

The process of the present invention may also be used when the equilibrium catalyst consists of a physical mixture of 50 to 99 wt. % conventional cracking catalyst comprising zeolite Y in a matrix and 1 to 49 wt. % of an additive catalyst comprising 5 to 80 wt. % MCM-49 in an amorphous matrix. Preferably the MCM-49 is incorporated into a phosphorus stabilized matrix, most preferably with 0.5 to 5.0 wt. % phosphorus. Preferably the MCM-49 additive catalyst has a catalytically effective amount of phosphorous or a compound thereof to reduce coking.

The process may be used to crack feeds selected from the group of gas oil, vacuum gas oil, residual oil, vacuum resid, and mixtures thereof. The feed may be catalytically cracked to produce a C5—400° F., or a C5—430° F., gasoline fraction equal to at least 40 LV % of the hydrocarbon feed and a propylene, butylene and isobutane fraction equal to at least 50 LV % of the gasoline fraction. Most preferably the feed is cracked to produce a C5—400° F., or a C5—430° F., fraction equal to 40–50 LV % of the feed and a propylene, butylene and isobutane fraction equal to at least 55 LV % of the gasoline fraction.

The process may produce gasoline having an octane number at least 1.0, and preferably 2.0, higher than a like gasoline from the same FCC unit processing the same feed at the same conversion and cracking conditions in the absence of MCM-49 additive.

We claim:

1. A process for fluidized catalytic cracking, in the absence of added hydrogen, of a normally liquid hydrocarbon feed containing hydrocarbons boiling above 650° F. comprising cracking said liquid feed in a cracking reactor at fluidized catalytic cracking conditions by contact with a source of regenerated equilibrium catalyst in a finely divided form with particles of 20–100 microns and comprising catalytically effective amounts of MCM-49.

2. The process of claim 1 wherein said equilibrium catalyst contains 1 to 10 wt % MCM-49.

3. The process of claim 1 wherein the equilibrium catalyst comprises a physical mixture of:

50 to 99 wt. % conventional cracking catalyst comprising zeolite Y in a matrix; and 1 to 49 wt. % of an additive catalyst comprising 5 to 80 wt. % MCM-49 in an amorphous matrix.

4. The process of claim 1 wherein said MCM-49 is incorporated into a phosphorus stabilized matrix.

5. The process of claim 3 wherein said additive catalyst comprises 0.5 to 5.0 wt % phosphorus.

6. The process of claim 1 wherein said hydrocarbon feed is selected from the group of gas oil, vacuum gas oil, residual oil vacuum resid, and mixtures thereof, and said feed is catalytically cracked to produce:

a C5—400° F. gasoline fraction equal to at least 40 liquid volume % of said hydrocarbon feed; and a propylene, butylene and isobutane fraction equal to at least 50 liquid volume % of said produced gasoline fraction.

7. The process of claim 6 wherein said feed is catalytically cracked to produce:

a C5—400° F. gasoline fraction equal to 40–50 liquid volume % of said hydrocarbon feed; and a propylene, butylene and isobutane fraction equal to at least 55 liquid volume % of said produced gasoline fraction.

8. The process of claim 6 where said gasoline fraction has an octane number at least 1.0 higher than a like fraction from the same FCC unit processing the same feed at the same conversion and cracking conditions in the absence of said MCM-49 additive.

9. The process of claim 8 where said gasoline fraction has an octane number at least 2.0 higher.

10. A process for catalytically cracking a hydrocarbon feed boiling above 650° F. comprising:

a. charging said hydrocarbon feed to a riser catalytic cracking reactor;

b. charging a hot fluidized solids mixture from a catalyst regenerator to the base of said riser reactor, said mixture comprising a physical mixture of:

95 to 50 wt % base FCC catalyst containing at least one of zeolite Y, zeolite beta or both in a matrix, and 5 to 50 wt. % MCM-49 additive catalyst containing a catalytically effective amount of MCM-49 in an amorphous support;

c. catalytically cracking said feed at catalytic cracking conditions including a riser outlet temperature of about 925° to 1100° F. to produce catalytically cracked products including C3 and C4 olefins and a catalytically cracked naphtha fraction having an octane number and a spent solids mixture comprising base FCC catalyst and MCM-49 additive catalyst which are discharged from said outlet of said riser reactor;

d. separating in a vessel containing said riser outlet a cracked product rich vapor phase, which is withdrawn from said vessel, from a spent solids mixture rich phase containing base FCC catalyst and MCM-49 additive catalyst;

e. stripping said spent solids mixture in a stripping means at stripping conditions to produce a stripped solids phase;

f. decoking said stripped solids phase in a catalyst regeneration means operating at catalyst regeneration conditions to produce said hot fluidized solids mixture, which is recycled to the base of said riser reactor, and g. fractionating said cracked product rich vapor phase in a product fractionation means to produce an overhead vapor fraction, a liquid fraction containing at least one of C3 and C4 olefins and a catalytically cracked naphtha fraction.

11. The process of claim 10 where said cracked naphtha fraction has an octane number at least 1.0 higher than a like cracked naphtha fraction from the same FCC unit processing the same feed at the same conversion and cracking conditions in the absence of said MCM-49 additive.

12. The process of claim 11 where said cracked naphtha fraction has an octane number at least 2.0 higher.

13. The process of claim 10 wherein said additive comprises a catalytically effective amount of phosphorous or a compound thereof to reduce coking.

14. The process of claim 10 wherein said MCM-49 is incorporated into a phosphorus stabilized matrix.

15. The process of claim 14 wherein said additive comprises 0.5 to 5.0 wt % phosphorus.

16. The process of claim 10 wherein said hydrocarbon feed is selected from the group of gas oil, vacuum gas oil, residual oil vacuum resid, and mixtures thereof, and said feed is catalytically cracked to produce:

a C5—400° F. gasoline fraction equal to at least 40 liquid volume % of said hydrocarbon feed; and a propylene, butylene and isobutane fraction equal to at least 50 liquid volume % of said produced gasoline fraction.

17. The process of claim 16 wherein said feed is catalytically cracked to produce:

a C5—400° F. gasoline fraction equal to 40–50 liquid volume % of said hydrocarbon feed; and a propylene, butylene and isobutane fraction equal to at least 55 liquid volume % of said produced gasoline fraction.

* * * * *